(12) United States Patent
Gladden et al.

(10) Patent No.: US 6,374,612 B1
(45) Date of Patent: Apr. 23, 2002

(54) INTERSTAGE COOLING OF A MULTI-COMPRESSOR TURBOCHARGER

(75) Inventors: John R. Gladden; Phillip J. Houtz, both of Lafayette, IN (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/666,440

(22) Filed: Sep. 21, 2000

(51) Int. Cl.⁷ ................................................. F02B 33/44
(52) U.S. Cl. ..................... 60/605.2; 123/559.1; 417/242
(58) Field of Search ................... 60/605.2; 123/559.1, 123/563; 417/242

(56) References Cited

U.S. PATENT DOCUMENTS

| | | | |
|---|---|---|---|
| 4,105,372 A | * 8/1978 | Mishina et al. | 417/243 |
| 4,125,345 A | * 11/1978 | Yoshinaga et al. | 417/243 |
| 4,155,684 A | * 5/1979 | Curiel et al. | 417/243 X |
| 4,167,371 A | * 9/1979 | Eskeli | 417/53 |
| 4,193,738 A | 3/1980 | Landis, Jr. et al. | |

* cited by examiner

Primary Examiner—Hoang Nguyen
(74) Attorney, Agent, or Firm—Todd T. Taylor

(57) ABSTRACT

An interstage cooling system for the turbocharger of an internal combustion engine is disclosed. Diffuser vanes, turning vanes and/or deswirling vanes are used as the heat exchangers in the interstage duct. A coolant fluid is supplied to the heat exchangers and flows between the heat exchangers in series through internal coolant links or through internal cavities defined by the turbocharger housing.

21 Claims, 2 Drawing Sheets

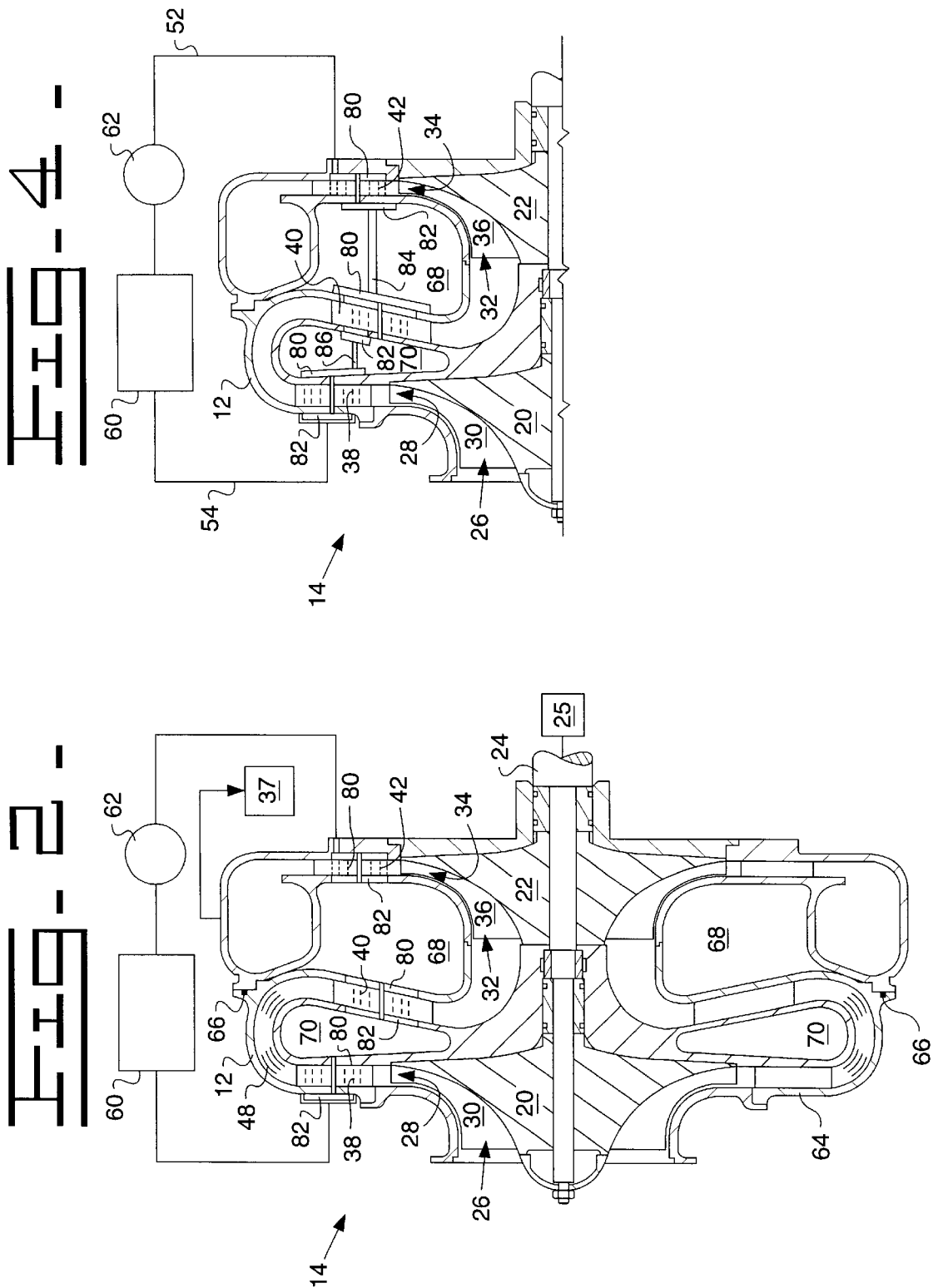

INTERSTAGE COOLING OF A MULTI-COMPRESSOR TURBOCHARGER

TECHNICAL FIELD

The present invention relates to turbocharger systems for internal combustion engines, and, more particularly, to an interstage cooler for a turbocharger system.

BACKGROUND ART

A limiting factor in the performance of an internal combustion engine is the amount of combustion air that can be delivered to the intake manifold for combustion in the engine cylinders. Atmospheric pressure is often inadequate to supply the required amount of air for proper operation of an engine. Therefore, it is common practice to use an auxiliary system to supply additional air to the intake manifold. It is known to supply additional air to the intake manifold through the use of a turbocharger.

Turbochargers can be used to supply combustion air to an engine at a higher pressure and higher density than atmospheric pressure and ambient density. The turbocharger can be used to make up for loss of power due to altitude or to increase power that can be obtained from the engine of a given displacement, thereby reducing the cost, weight and size of an engine for a given power output.

A conventional multi-stage turbocharger includes a turbine section and two compressor sections. A common shaft interconnects the turbine wheel of the turbine section with compressor wheels in the compressor sections. A stream of exhaust gases from the engine is conducted from the exhaust manifold to the turbine section of the turbocharger. The stream of exhaust gases passing through the turbine section causes the turbine wheel to rotate, turning the shaft, and thereby rotating the compressor wheels in the compressor section. Ambient air to be used for combustion in the internal combustion engine is brought into an inlet for the first compressor section. The air is compressed by the first compressor wheel, and passes from the first compressor section through a first compressor section outlet to the inlet of the second compressor section, for further compression. The out flow from the second compressor section exits the turbocharger at the second compressor section outlet, and is directed to the inlet manifold of the internal combustion engine.

An interstage duct is used to conduct the compressed air from the first compressor section outlet to the inlet of the second compressor section. Foils or vanes near the compressor section inlets or outlets, or in the interstage duct, influence the compressed air stream flow. For example, diffuser vanes at the compressor section outlets are used to decrease air stream velocity and increase static pressure. Deswirling vanes near the second and subsequent inlets orient the air stream approaching the compressor wheel. Turning vanes may be used in the interstage duct to direct air flow around tight bends in the duct, to reduce losses in the duct.

One of the problems associated with the use of turbochargers is the build up of heat in the compressed air. Heat reduction has been accomplished through the use of external cooling units between the last compressor outlet and the intake manifold, so-called "aftercoolers". However, the build up of heat in the first compressor stage decreases the efficiency of the second compressor stage. To address this problem, so called "interstage coolers" have been used to cool the airstream between compressor stages. Commonly, interstage coolers between the compression stages of a turbocharger have been designed with the use of an external heat exchanger through which the air is passed as it flows from a first compressor stage to a second compressor stage.

External interstage coolers provide no cooling of the turbocharger components themselves and can be bulky, utilizing additional space in what can be cramped environments around the internal combustion engine for which the turbocharger is used.

It is known from U.S. Pat. No. 4,193,738 to cool the adjustable nozzle vanes of a gas turbine engine by circulating a coolant fluid through the interior of the vane. A floating seal is provided to minimize leakage between the coolant flow circuit and the hot gas flow path.

The present invention is directed to overcoming one or more of the problems set forth above.

DISCLOSURE OF THE INVENTION

In one aspect of the invention, a multi-compressor turbocharger is provided with a rotatable shaft, and a multistage compressor including a first compressor wheel carried by the shaft, a first inlet associated with the first compressor wheel, a radially extending first outlet associated with the first compressor wheel, a second compressor wheel carried by the shaft, a second inlet associated with the second compressor wheel, and a radially extending second outlet associated with the second compressor wheel; an interstage duct fluidly interconnecting in series the first outlet of the first compressor wheel and the second inlet of the second compressor wheel; at least one heat exchanger disposed in the interstage duct; and a cooling fluid supply system fluidly connected to the heat exchanger.

In another aspect of the invention, a method of operation of a turbocharger includes: providing a multi-stage compressor including a first compressor wheel carried by the shaft, a first inlet associated with the first compressor wheel, a radially extending first outlet associated with the first compressor wheel, a second compressor wheel carried by the shaft, a second inlet associated with the second compressor wheel, and a radially extending second outlet associated with the second compressor wheel; an interstage duct fluidly interconnecting in series the first outlet of the first compressor wheel and the second inlet of the second compressor wheel; fluidly interconnecting in series the first outlet of the first compressor with the second inlet of the second compressor wheel using an interstage duct; positioning a heat exchanger within the interstage duct; rotating the first compressor wheel and the second compressor wheel carried by the shaft; and circulating a cooling fluid through the heat exchanger.

BRIEF DESCRIPTION OF THE DRAWINGS

FIG. 2 is a cross-sectional view of a twin compressor turbocharger interstage cooling device of the present invention, shown in partial schematic;

FIG. 4 is a fragmentary cross-sectional view of a multi-compressor turbocharger interstage cooling device according to an alternative embodiment of the present invention.

BEST MODE FOR CARRYING OUT THE INVENTION

Figure 1:
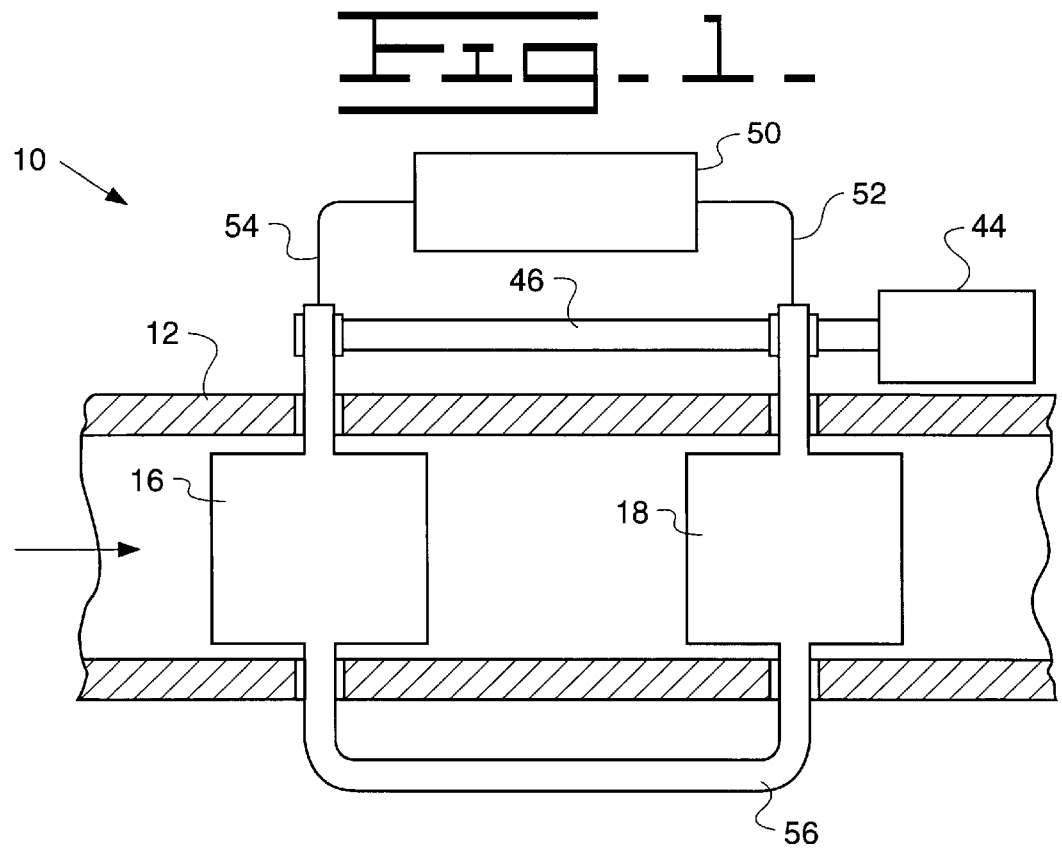
FIG. 1 is a schematic representation of an interstage cooling system for a multi-stage turbocharger according to the present invention.
Figure 3:
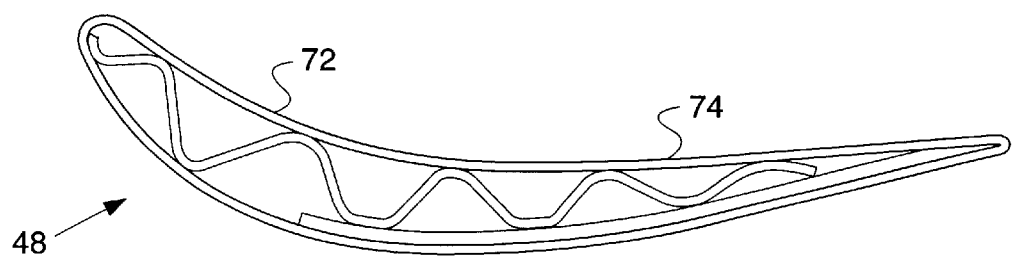
FIG. 3 is cross-sectional view of a compressed air directing member for a multi-stage turbocharger.

Referring now to the drawings, and more particularly to FIG. 1, an interstage cooling system 10 is shown schematically, for operation in an interstage duct 12 of a twin compressor turbocharger 14. Interstage cooling system 10 includes first and second heat exchangers 16 and 18 disposed in the interstage duct 14.

Twin compressor turbocharger 14 is a multi-stage compressor with a first compressor wheel 20 and a second compressor wheel 22 commonly carried by a shaft 24. It will be understood by those familiar with the art that a turbine, indicated schematically by box 25, has a turbine wheel similarly disposed on shaft 24, and is operatively disposed in an exhaust gas stream to provide motive force to turbocharger 14.

A first inlet 26 open to ambient air communicates with first compressor wheel 20. First inlet 26 is oriented axially with respect to first compressor wheel 20. A first outlet 28 is in flow communication with first inlet 26 and with a first compressing zone 30 associated with first compressor wheel 20. First outlet 28 is oriented radially with respect to first compressor wheel 20.

A second inlet 32 is in flow communication with second compressor wheel 22, and is oriented axially with respect to second compressor wheel 22. A second outlet 34 is in flow communication with second inlet 32 and with a second compressing zone 36 associated with second compressor wheel 22. Second outlet 32 is oriented radially with respect to second compressor wheel 22, and directs the compressed air stream from turbocharger 14 to an intake manifold 37 of the internal combustion engine.

Interstage duct 12 connects first outlet 28 with second inlet 32. First diffuser vanes 38 are disposed in interstage duct at first outlet 28. Deswirling vanes 40 are disposed at the end of interstage duct 12 leading in to second inlet 32. Second diffuser vanes 42 are disposed at second outlet 34. Collectively, diffuser vanes 38, 42 and deswirling vanes 40 are referred to as compressed air directing members, or CADM, by acronym.

In accordance with the present invention, the CADM may be provided as rings of vanes positioned in interstage duct 12, with each individual CADM being disposed on an axis about which the CADM is pivotal. Orientation may be adjusted to optimize flow characteristics in interstage duct 12. A motor 44 and drive connection 46 are provided to effect such change in orientation.

A further form of CADM is a turning vane 48, positioned in interstage duct 12 to direct air flow around tight curves in interstage duct 12. While turning vanes 48 may be similarly adjustable, turning vanes 48 also may be fixed in position in interstage duct 12.

Interstage cooling system 10 has a cooling fluid supply system 50 which supplies coolant to heat exchangers 16 and 18. In known fashion, cooling fluid supply system 50 has a heat exchanger, appropriate fans, pumps and the like. Cooling fluid supply system 50 may be a separate, dedicated system for interstage cooling system 10, or may be a part of a cooling system for the internal combustion engine.

As shown schematically in FIG. 1, the interstage cooling system 10 includes a coolant supply line 52 from cooling fluid supply system 50 to second heat exchanger 18. A coolant return line 54 is disposed between first heat exchanger 16 and cooling fluid supply system 50. A coolant connecting line 56 is disposed in flow communication between first heat exchanger 16 and second heat exchanger 18.

As shown in more detail in FIG. 2, cooling fluid supply system 50 includes a radiator 60. A coolant pump 62 is disposed in coolant supply line 52. Twin compressor turbocharger 14 has a housing 64 that defines first and second inlet ducts 26 and 32, respectively; first and second outlet ducts 28 and 34, respectively, and interstage duct 12. A fluid seal 66, in the form of an o-ring or the like, is provided between the parts of housing 64 generally defining outlet duct 34 and interstage duct 12; thereby defining a fluid tight cavity 68. Interstage duct 12, in order to receive the air stream from radially oriented first outlet 28 and direct the stream to axially oriented second inlet 32, is a generally looped body defining within itself a cavity 70.

Diffuser vanes 38 or 42, deswirling vanes 40 and turning vanes 48, although different in shape for their specific purpose, each are generally hollow bodies defined by outer walls 72, with internal reinforcements 74. Diffuser vanes 38 or 42, deswirling vanes 40 and turning vanes 48 if supplied with a coolant, may function as a heat exchanger 16 or 18 in the interstage cooling system 10.

In the embodiment of interstage cooling system 10 shown in FIG. 2, coolant supply line 52 is connected in flow communication with diffuser vanes 42. Cavity 68 is in flow communication between and with diffuser vanes 42 and deswirling vanes 40. Cavity 70 is in flow communication with and between deswirling vanes 40 and diffuser vanes 38. Coolant return line 54 is in flow communication between diffuser vanes 38 and radiator 60. An inlet header 80 and an outlet header 82, is disposed on each side of a CADM used as a heat exchanger 16 or 18. Each header 80, 82 has a suitable floating seal to separate the coolant path from the compressed air path as each flows in heat exchange relationship through the CADM.

In the alternative embodiment shown in FIG. 4, cavities 68 and 70 are not coolant conducting regions, and the fluid tight seals therefore, such as o-ring 66 maybe omitted. Instead, a first coolant link 84 is provided between diffuser vanes 42 outlet header 82 and deswirling vanes 40 inlet header 80. A second coolant link 86 is provided between deswirling vanes 40 outlet header 82 and diffuser vanes 48 inlet header 82.

INDUSTRIAL APPLICABILITY

In use, coolant from radiator 60 is pumped by pump 62 through coolant supply line 52 to diffuser vanes 42. The coolant may be water, oil, air, glycol, or other fluid useful for receiving heat transfer from the hot compressed air stream, and releasing heat contained by the coolant in radiator 60. Coolant is distributed by inlet header 80 of diffuser vanes 42 to the individual vanes, and flows through each such vane in heat exchange relationship with compressed air flowing past the vanes. Coolant flowing from diffuser vanes 42 is collected in diffuser vanes 42 outlet header 82, and is conducted via cavity 68 (FIG. 2) or first coolant link 84 (FIG. 4) to deswirling vanes 40 inlet header 80, to pass through the individual deswirling vanes and into deswirling vanes 40 outlet header 82. The coolant flows via cavity 70 (FIG. 2) or second coolant link 86 (FIG. 4) from deswirling vanes 40 outlet header 82 to first diffuser vanes 38 inlet header 80, to pass similarly through each individual vane of diffuser vanes 38, first diffuser vanes outlet header 82 and coolant return line 54 to radiator 60.

Ambient air enters turbocharger 14 through first inlet 26. The air is compressed by first compressor wheel 20 in first compressing zone 30, and flows in to interstage duct 12, through first diffuser vanes 38. The flow of air continues through interstage duct 12, through deswirling vanes 40, and into second inlet 32 for second compressor wheel 22. The air is further compressed by second compressor wheel 22 in second compressing zone 36, and flows through second diffuser vanes 42 to second outlet 34 to intake manifold 37 of the internal combustion engine. As the air flows through interstage duct 12, past any of the CADM used as heat exchangers 16 or 18, heat in the compressed air stream is transferred to the coolant flowing through the CADM interior.

In diffuser vanes 38 and 42, deswirling vanes 40, and turning vanes 48 the air and coolant pass in heat exchange relationship such that heat is conducted from the air to the coolant fluid. In the embodiment shown in FIG. 2, additional heat transfer may occur between the hot compressed air and the housing 64, where housing 64 separates the air flow from the coolant fluid in the cavities 68 and 70. The coolant thereby cools the housing components as well.

It should be understood that turning vanes 48 may be similarly connected to coolant inlet and outlet headers, and incorporated in the coolant circuit with diffuser vanes 38 or 42 and deswirling vanes 40, to provide additional heat exchangers.

While the invention has been shown on a twin compressor turbocharger with turbine and compressor wheels mounted on a single shaft, it can also be incorporated into the interstage ducts of series connected turbochargers having independent turbines and compressors. While shown for a turbocharger having compressor wheels facing the same direction, the present invention can also be used for turbochargers having back to back oriented compressor wheels.

The present invention provides effective cooling of air between stages of a multi-stage turbocharger. By cooling air between compressor stages compressor efficiency is improved and less expensive metals maybe used because of lower heat resistance requirements. By modifying and utilizing existing internal structures as heat exchangers, space requirements are reduced, with no added effect on the air flow through the interstage duct.

Other aspects, objects and advantages of this invention can be obtained from a study of the drawings, the disclosure and the appended claims.

What is claimed is:

1. A turbocharger for an internal combustion engine, comprising:
    a rotatable shaft;
    a turbine including a turbine wheel carried by said shaft;
    a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;
    an interstage duct fluidly interconnecting in series said first outlet of said first compressor with said second inlet of said second compressor;
    at least one heat exchanger disposed in said interstage duct, said heat exchanger defining a plurality of diffuser vanes at said first outlet; and
    a cooling fluid supply system fluidly connected to said diffuser vanes defined by said heat exchanger.

2. A turbocharger for an internal combustion engine, comprising:
    a rotatable shaft;
    a turbine including a turbine wheel carried by said shaft;
    a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;
    an interstage duct fluidly interconnecting in series said first outlet of said first compressor with said second inlet of said second compressor;
    at least one heat exchanger disposed in said interstage duct; said at least one heat exchanger including a plurality of deswirling vanes; and
    a cooling fluid supply system fluidly connected to said heat exchanger.

3. The turbocharger of claim 2, including a second heat exchanger disposed in said interstage duct in fluid communication with said at least one heat exchanger.

4. The turbocharger of claim 3, wherein said second heat exchanger includes a plurality of diffuser vanes at said first outlet.

5. The turbocharger of claim 4, including at least one housing defining said first inlet, said first outlet, said second inlet, said second outlet, said interstage duct and an internal cavity in fluid communication with and between said deswirling vanes and said diffuser vanes.

6. The turbocharger of claim 4, wherein said at least one heat exchanger includes a plurality of turning vanes.

7. The turbocharger of claim 1, wherein a second heat exchanger includes a plurality of deswirling vanes at said second inlet, and a third heat exchanger defines a plurality of diffuser vanes at said second outlet.

8. The turbocharger of claim 1, wherein each of said first compressor wheel and said second compressor wheel face in a common direction.

9. The turbocharger of claim 1, including at least one housing defining said first inlet, said first outlet, said second inlet, said second outlet and said interstage duct.

10. The turbocharger of claim 9, wherein said at least one housing defines internal cavities in fluid communication with said at least one heat exchanger and said cooling fluid supply system.

11. A multi-compressor interstage cooling system, comprising:
    a rotatable shaft;
    a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel, said second outlet being in fluid communication with said intake manifold,
    an interstage duct fluidly interconnecting in series said first outlet of said first compressor with said second inlet of said second compressor;
    at least one heat exchanger disposed in said interstage duct, said at least one heat exchanger defining at least one of diffuser vanes at said first outlet, diffuser vanes at said second outlet, turning vanes in said interstage duct and deswirling vanes at said second inlet; and
    a coolant fluid supply system in fluid flow communication with said at least one heat exchanger.

12. The multi-compressor interstage cooling system of claim 11, further comprising at least one housing defining said first inlet, said first outlet, said second inlet, said second outlet and said interstage duct.

13. The multi-compressor interstage cooling system of claim 12, wherein said at least one housing includes a coolant link in fluid communication with said at least one heat exchanger and said coolant fluid supply system.

14. The multi-compressor interstage cooling system of claim 11, further comprising a second heat exchanger disposed in said interstage duct, in fluid communication with said at least one heat exchanger, said second heat exchanger defining another of diffuser vanes at said first outlet, diffuser vanes at said second outlet, turning vanes in said interstage duct and deswirling vanes at said second inlet.

15. The multi-compressor interstage cooling system of claim 14, including at least one housing defining said first inlet, said first outlet, said second inlet, said second outlet, said interstage duct and a fluid flow cavity between said at least one heat exchanger and said second heat exchanger.

16. The multi-compressor interstage cooling system of claim 14, further comprising a coolant link in fluid flow communication between said at least one heat exchanger and said second heat exchanger.

17. An internal combustion engine, comprising:
   an intake manifold;
   a rotatable shaft;
   a turbine having a turbine wheel carried by said shaft;
   a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;
   a compressed air duct fluidly interconnecting in series said second outlet of said second compressor with said intake manifold;
   an interstage duct fluidly interconnecting in series said first outlet of said first compressor with said second inlet of said second compressor;
   at least one heat exchanger disposed in said interstage duct, said at least one heat exchanger defining at least one of diffuser vanes at said first outlet, diffuser vanes at said second outlet, turning vanes in said interstage duct and deswirling vanes at said second inlet; and
   a cooling fluid supply system fluidly connected to said heat exchanger.

18. A method of operating a turbocharger in an internal combustion engine, comprising the steps of:
   providing a multi-stage compressor including a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;
   fluidly interconnecting in series said first outlet of said first compressor with said second inlet of said second compressor using an interstage duct;
   positioning a heat exchanger within said interstage duct, said heat exchanger defining at least one of diffuser vanes at said first outlet, diffuser vanes at said second outlet, turning vanes in said interstage duct and deswirling vanes at said second inlet;
   rotating said turbine wheel, said first compressor wheel and said second compressor wheel carried by said shaft; and
   circulating a cooling fluid through said heat exchanger.

19. The method of claim 18, including the steps of providing a second heat exchanger in said interstage duct, said second heat exchanger defining another of diffuser vanes at said first outlet, diffuser vanes at said second outlet, turning vanes in said interstage duct and deswirling vanes at said second inlet; and circulating a cooling fluid through said second heat exchanger.

20. The method of claim 18, including the steps of providing a pivotal mounting for said heat exchanger, and selectively altering the position of said heat exchanger relative to said interstage duct.

21. The method of claim 18, said circulating step comprising circulating one of a liquid coolant and air through said heat exchanger.

\* \* \* \* \*